United States Patent
Chu et al.

(10) Patent No.: US 12,536,021 B2
(45) Date of Patent: Jan. 27, 2026

(54) METHOD AND SYSTEM FOR PREDICTING BRANCH INSTRUCTIONS

(71) Applicant: REALTEK SEMICONDUCTOR CORP., Hsinchu (TW)

(72) Inventors: Chih-Hsien Chu, Hsinchu (TW); Yu-Ju Shih, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 123 days.

(21) Appl. No.: 18/373,032

(22) Filed: Sep. 26, 2023

(65) Prior Publication Data

US 2024/0394063 A1   Nov. 28, 2024

(30) Foreign Application Priority Data

May 25, 2023   (TW) ................... 112119422

(51) Int. Cl.
  *G06F 9/38*   (2018.01)
  *G06F 9/30*   (2018.01)
(52) U.S. Cl.
  CPC ........ *G06F 9/3806* (2013.01); *G06F 9/30189* (2013.01)
(58) Field of Classification Search
  CPC .. G06F 9/3806; G06F 9/30189; G06F 9/3844; G06F 9/3875; G06F 9/3848
  See application file for complete search history.

(56) References Cited

U.S. PATENT DOCUMENTS

2006/0149947 A1 * 7/2006 Su ................. G06F 9/3806
                                                  712/239
2019/0317769 A1 * 10/2019 Hu .................. G06F 9/3848

FOREIGN PATENT DOCUMENTS

WO   WO-2021108007 A1 *  6/2021 ........... G06F 9/3858

OTHER PUBLICATIONS

Loh et al., Exploiting Bias in the Hysteresis Bit of 2-bit saturating Counters in Branch Predictors, Jun. 2003, The Journal of Instruction-Level Parallelism, vol. 5, p. 1 (Year: 2003).*

* cited by examiner

*Primary Examiner* — Jyoti Mehta
*Assistant Examiner* — Emilio Alcantara-Ramos
(74) *Attorney, Agent, or Firm* — Li & Cai Intellectual Property (USA) Office

(57) ABSTRACT

A method and a system for predicting branch instructions are provided. The method includes reading a branch target buffer that stores a plurality of reference program counter (PC) values and a plurality of prediction target addresses. The reference PC values include plurality of history PC values of a plurality of history instructions that are executed before the branch instructions, and the plurality of prediction target addresses corresponding to the plurality of history PC values are a plurality of target addresses of the branch instructions, respectively. The method then checks that a PC value of a first instruction that enters an instruction fetch stage matches with a history PC value of a history instruction executed before a branch instruction, for obtaining beforehand a branch target address of a second instruction that is executed after the first instruction.

12 Claims, 4 Drawing Sheets when a first instruction enters the first instruction fetch stage, configuring a branch predictor to read a branch target buffer that stores a plurality of reference PC values and a plurality of prediction target addresses that respectively correspond to the plurality of reference PC values, and determine whether or not a PC value of the first instruction matches with one of the plurality of reference PC values; the plurality of reference PC values stored in the branch target buffer including a plurality of history PC values of a plurality of history instructions that are executed before a plurality of branch instructions, and the plurality of prediction target addresses corresponding to the plurality of history PC values being a plurality of target addresses of the plurality of branch instructions, respectively ~S110 when the first instruction enters the second instruction fetch stage, in response to the PC value of the first instruction matching with one of the plurality of reference PC values, performing a branch prediction according to a prediction counter value, and, in response to a result of the branch prediction being that the branch is taken, selecting a branch target address according to the plurality of prediction target addresses stored in the branch target buffer ~S120

FIG. 1

METHOD AND SYSTEM FOR PREDICTING BRANCH INSTRUCTIONS

CROSS-REFERENCE TO RELATED PATENT APPLICATION

This application claims the benefit of priority to Taiwan Patent Application No. 112119422, filed on May 25, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to branch prediction, and more particularly to a method and a system for predicting a branch that is able to check that a program counter (PC) value of a first instruction that enters an instruction fetch stage matches with a history PC value of a history instruction executed before a branch instruction, for obtaining beforehand a branch target address of a second instruction that is executed after the first instruction.

BACKGROUND OF THE DISCLOSURE

In the existing technology, a processor executes a series of multiple instructions by using a pipelined architecture. The pipelined architecture can include stages such as an instruction fetch stage, an instruction decode stage, and an execute stage. In order to improve an efficiency of executing the multiple instructions, a plurality of instructions can be simultaneously processed in different stages of the pipelined architecture. That is, when a first instruction enters a second stage of the pipelined architecture, a second instruction can enter a first stage of the pipelined architecture.

Specifically, an instruction fetch stage of the pipelined architecture can be sequentially divided into a first instruction fetch stage and a second instruction fetch stage. Furthermore, instructions can include branch instructions that are used to change a sequence by which the instructions are executed. However, when a branch instruction enters the second instruction fetch stage and confirms that a branch is taken, the processor then flushes a next one of the instructions that has entered the first instruction fetch stage. That is, the processor flushes an instruction address of the next one of the instructions, such that one clock cycle is wasted.

SUMMARY OF THE DISCLOSURE

In response to the above-referenced technical inadequacies, the present disclosure provides a method and a system for predicting a branch. The method and the system can check that a PC value of a first instruction that enters an instruction fetch stage matches with a history PC value of a history instruction executed before a branch instruction, for obtaining beforehand a branch target address of a second instruction that is executed after the first instruction.

In one aspect, the present disclosure provides a method for predicting a branch. The method is adapted to a processor. The processor executes a plurality of instructions that are in a series by using a pipelined architecture, and the plurality of instructions respectively have a plurality of program counter (PC) values. The pipelined architecture includes a first instruction fetch stage and a second instruction fetch stage. The method includes steps as follows: when a first instruction of the plurality of instructions enters the first instruction fetch stage, configuring a branch predictor to read a branch target buffer that stores a plurality of reference PC values and a plurality of prediction target addresses that respectively correspond to the plurality of reference PC values, and determine whether or not a PC value of the first instruction matches with one of the plurality of reference PC values; the plurality of reference PC values stored in the branch target buffer including a plurality of history PC values of a plurality of history instructions that are executed before a plurality of branch instructions, and the plurality of prediction target addresses corresponding to the plurality of history PC values being a plurality of target addresses of the plurality of branch instructions, respectively; and when the first instruction enters the second instruction fetch stage, in response to the PC value of the first instruction matching with one of the plurality of reference PC values, performing a branch prediction according to a prediction counter value, and, in response to a result of the branch prediction being that the branch is taken, selecting a branch target address according to the plurality of prediction target addresses stored in the branch target buffer.

In another aspect, the present disclosure provides a system for predicting a branch. The system is adapted to a processor. The processor executes a plurality of instructions that are in a series by using a pipelined architecture, and the plurality of instructions respectively have a plurality of PC values. The pipelined architecture includes a first instruction fetch stage and a second instruction fetch stage. The system includes a branch predictor. The branch predictor includes a branch target buffer. The branch target buffer stores a plurality of reference PC values and a plurality of prediction target addresses that respectively correspond to the plurality of reference PC values. The branch predictor is configured to execute steps as follows: when a first instruction of the plurality of instructions enters the first instruction fetch stage, reading the branch target buffer, and determining whether or not a PC value of the first instruction matches with one of the plurality of reference PC values; the plurality of reference PC values stored in the branch target buffer including a plurality of history PC values of a plurality of history instructions that are executed before a plurality of branch instructions, and the plurality of prediction target addresses corresponding to the plurality of history PC values being a plurality of target addresses of the plurality of branch instructions, respectively; and when the first instruction enters the second instruction fetch stage, in response to the PC value of the first instruction matching with one of the plurality of reference PC values, performing a branch prediction according to a prediction counter value, and, in response to a result of the branch prediction being that the branch is taken, selecting a branch target address according to the plurality of prediction target addresses stored in the branch target buffer.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 1 is a flowchart of a method for predicting a branch according to the present disclosure;

DETAILED DESCRIPTION OF THE EXEMPLARY EMBODIMENTS

Figure 2:
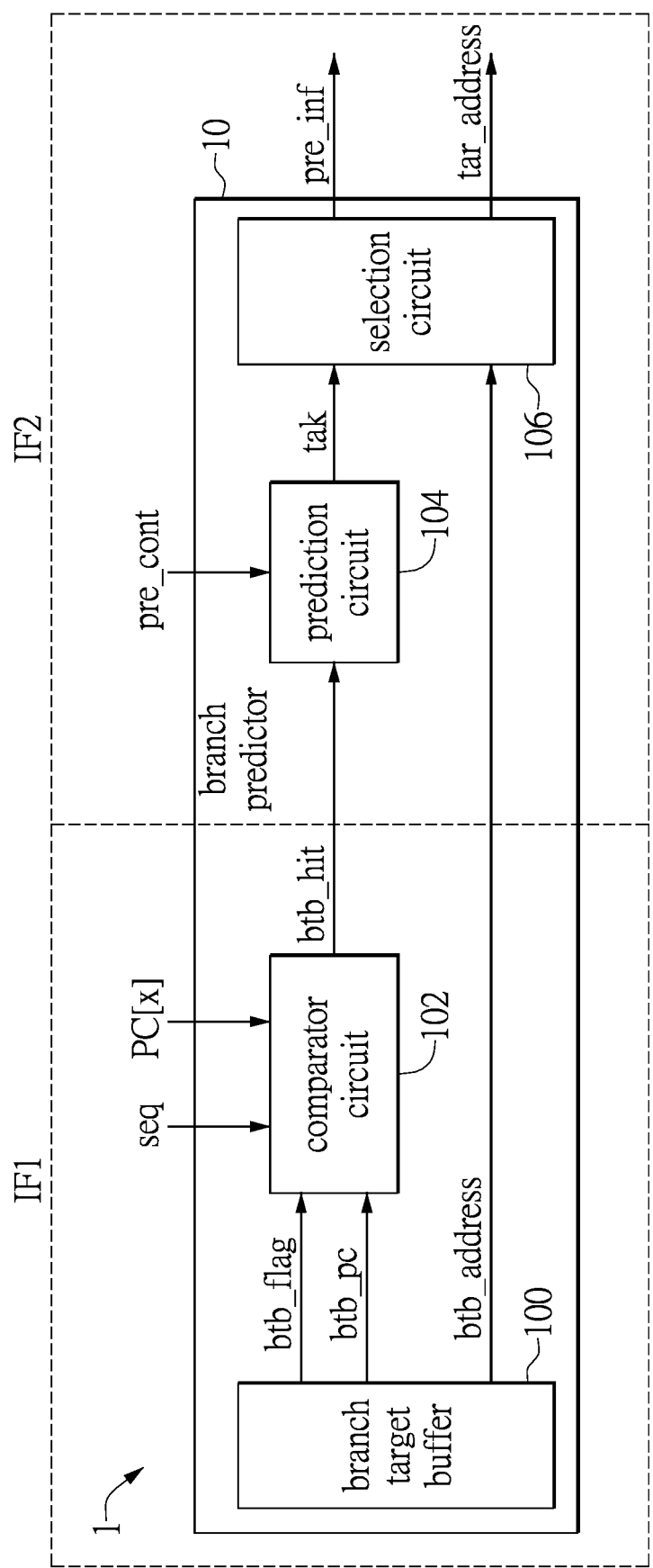
FIG. 2 is a schematic functional block diagram of a system for predicting a branch according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Embodiments

Referring to FIG. 1, FIG. 1 is a flowchart of a method for predicting a branch according to the present disclosure. The method provided by the present disclosure is adapted to a processor that executes a plurality of instructions that are in a series by using a pipelined architecture. The plurality of instructions respectively have a plurality of program counter (PC) values, and the pipelined architecture includes a first instruction fetch stage and a second instruction fetch stage. The method includes the following steps:

Step S110: when a first instruction of the plurality of instructions enters the first instruction fetch stage, configuring a branch predictor to read a branch target buffer that stores a plurality of reference PC values and a plurality of prediction target addresses that respectively correspond to the plurality of reference PC values, and determine whether or not a PC value of the first instruction matches with one of the plurality of reference PC values. The plurality of reference PC values stored in the branch target buffer include a plurality of history PC values of a plurality of history instructions that are executed before a plurality of branch instructions, and the plurality of prediction target addresses corresponding to the plurality of history PC values are a plurality of target addresses of the plurality of branch instructions, respectively.

Step S120: when the first instruction enters the second instruction fetch stage, in response to the PC value of the first instruction matching with one of the plurality of reference PC values, performing a branch prediction according to a prediction counter value, and, in response to a result of the branch prediction being that the branch is taken, selecting a branch target address according to the plurality of prediction target addresses stored in the branch target buffer.

Specifically, the PC value is an instruction address, and the method of the present disclosure can use a plurality of history instruction addresses of a plurality of history instructions that are executed before a plurality of branch instruction as indices to determine whether or not the history instruction addresses include an instruction address of the first instruction. Therefore, the method of the present disclosure can check that a PC value of a first instruction that enters an instruction fetch stage matches with a history PC value of a history instruction executed before a branch instruction, so as to determine that a second instruction executed after the first instruction is a branch instruction for obtaining beforehand a branch target address of the second instruction. In other words, the method of the present disclosure can provide a look-ahead mechanism.

However, in order to preserve the existing branch prediction process, the reference PC values stored by the branch target buffer may also include a plurality of branch PC values of a plurality of branch instructions, and the prediction target addresses corresponding to the branch PC values are the target addresses of the branch instructions, respectively. In addition, the branch target buffer of this embodiment may also store a plurality of flag values corresponding to the reference PC values, and each of the flag value indicate whether or not the corresponding reference PC value is one of the history PC values.

In other words, each of the flag values can indicate whether or not the corresponding reference PC value is used to assist the branch predictor to perform a branch prediction on the second instruction performed after the first instruction. For example, a flag value of 1 can indicate whether or not the corresponding reference PC value is one of the history PC values and is used to assist the branch predictor to perform the branch prediction on the second instruction executed after the first instruction. On the other hand, a flag value of 0 can indicate that the corresponding reference PC value is practically a branch PC value of a branch instruction, so that the reference PC value is not used to assist the branch predictor to perform the branch prediction on the second instruction executed after the first instruction. The reference PC value is used to assist the branch predictor to perform the branch prediction on the first instruction, such that the existing branch prediction process is preserved.

Reference is made to FIG. 2, which is a schematic functional block diagram of a system for predicting a branch according to a first embodiment of the present disclosure. As shown in FIG. 2, the system 1 can include a branch predictor 10. The branch predictor 10 can include a branch target buffer 100, a comparator circuit 102, a prediction circuit 104, and a selection circuit 106. The branch target buffer 100 stores a plurality of reference PC values btb_pc and a plurality of prediction target addresses btb_address corresponding to the plurality of reference PC values btb_pc.

Accordingly, the plurality of reference PC values btb_pc stored in the branch target buffer 100 can include a plurality of history PC values of a plurality of history instruction that are executed before the plurality of branch instructions, and the branch target buffer can further store a plurality of flag values btb_flag that correspond to the plurality of reference PC values btb_pc. Each of the flag values can indicate whether or not the corresponding reference PC value is one of the history PC values. Furthermore, the branch predictor 10 is configured to execute the aforementioned step S110 and step S120.

Specifically, when a first instruction enters a first instruction fetch stage IF1, the branch predictor 10 reads a plurality of flag values btb_flag, a plurality of reference PC values btb_pc, and a plurality of prediction target addresses btb_address that are stored in the branch target buffer 100, and the comparator circuit 102 is used to determine whether or not a PC value PC[x] of the first instruction matches with one of the plurality of reference PC values btb_pc stored in the branch target buffer 100.

For ease of description, PC[x] is used to indicate a PC value of the first instruction. The numeral x can be a serial number of the first instruction as instructions executed in the processor. That is to say, although terms "first" and "second" are used herein to describe two instructions, the two instructions are not limited by the terms, and the terms are mainly used to differentiate one of the instructions and a next one of the instructions that is executed after the one of the instructions.

In addition, before determining whether or not the PC value PC[x] of the first instruction matches with one of the reference PC value, the branch predictor 10 can obtain a sequential state value seq of the first instruction. The sequential state value seq of the first instruction is used to indicate whether or not the first instruction has a jump case before entering the first instruction fetch stage IF1. Cases such as jump instructions, branch instructions, interrupts, and exceptions all cause an instruction arrangement to be non-sequential. In such cases, a sequence of the PC value of the second instruction cannot be predicted, and the branch prediction cannot be performed on the second instruction. In addition, a sequential state value seq of the first instruction of 1 indicates that the PC value PC[x] of the first instruction is sequential, and a sequential state value seq of the first instruction of 0 indicates that the PC value PC[x] of the first instruction is non-sequential, but the present disclosure in not limited thereto.

It should be noted that, although the PC value PC[x] of the first instruction matches with one of the reference PC values, if the PC value PC[x] of the first instruction is non-sequential, the branch predictor 10 cannot use the look-ahead mechanism, and the branch predictor 10 needs to use the existing branch prediction process. Therefore, the branch predictor 10 can input the flag values btb_flag, the reference PC values btb_pc, the sequential state value seq of the first instruction, and the PC value PC[x] of the first instruction into the comparator circuit 102 to determine whether or not the PC value PC[x] of the first instruction matches with one of the reference PC values and whether or not the PC value PC[x] of the first instruction is sequential.

On the other hand, if the PC value PC[x] of the first instruction matches with one of the reference PC values and the PC value PC[x] of the first instruction is sequential, the branch predictor 10 is able to use the look-ahead mechanism. Therefore, in response to determining that the PC value PC[x] of the first instruction matches with one of the reference PC values and the PC value PC[x] of the first instruction is non-sequential, the comparator circuit 102 can generate the hit signal btb_hit that is in a first state, and, in response to determining that the PC value PC[x] of the first instruction matches with one of the reference PC values and the PC value PC[x] of the first instruction is sequential, the comparator circuit 102 can generate the hit signal btb_hit that is in a second state.

In other words, according to a state of the hit signal btb_hit, the branch predictor 10 may further determine whether or not to perform a branch prediction for the first instruction or the second instruction that is executed after the first instruction, i.e., using an existing branch prediction process or the look-ahead mechanism. Alternatively, as shown in FIG. 2, when the first instruction enters the second instruction fetch stage IF2, the branch predictor 10 can perform the branch prediction by using the prediction circuit 104 according to a prediction counter value pre_cont, and select a branch target address tar_address by using the selection circuit 106 according to the prediction target addresses btb_address stored in the branch target buffer 100.

Specifically, when the prediction circuit 104 receives the hit signal btb_hit in the first state generated by the comparator circuit 102, i.e., in response to determining that the PC value PC[x] of the first instruction matches with one of the reference PC values and the PC value PC[x] of the first instruction is non-sequential, according to the prediction counter value pre_cont, the prediction circuit 104 performs the branch prediction for the first instruction. The prediction counter value pre_cont can be assumption and confidence level of the first instruction for the branch, and the result of the branch prediction is that the branch is taken or the branch is not taken. If the result of the branch prediction is that a branch is taken, the prediction circuit 104 generates a taken signal tak. Then, when the selection circuit 106 receives the taken signal tak generated by the prediction circuit 104, i.e., in response to a result of the branch prediction indicating that a branch is taken, according to the prediction target address btb_address stored in the branch target buffer 100, the selection circuit 106 selects the branch target address tar_address of the first instruction, and outputs the branch target address tar_address. Since the first instruction is a branch instruction, and the prediction circuit 104 performs branch prediction in real-time for the first instruction that enters the second instruction fetch stage IF2, the processor still needs to waste one clock cycle to flush the second instruction that has entered the first instruction fetch stage IF1, so that the branch target address tar_address of the first instruction output by the selection circuit 106 can be executed after the first instruction.

On the other hand, when the prediction circuit 104 receives the hit signal btb_hit in the second state generated by the comparator circuit 102, i.e., in response to determining that the PC value PC[x] of the first instruction matches with one of the reference PC values and the PC value PC[x] of the first instruction is sequential, according to the prediction counter value pre_cont, the prediction circuit 104 performs the branch prediction for the second instruction executed after the first instruction. Then, when the selection circuit 106 receives the taken signal tak generated by the prediction circuit 104, i.e., in response to a result of the branch prediction indicating that a branch is taken, according to the prediction target address btb_address stored in the branch target buffer 100, the selection circuit 106 selects the branch target address tar_address of the second instruction, and outputs the branch target address tar_address. Since the second instruction is a branch instruction at this time, and the prediction circuit 104 performs branch prediction beforehand for the second instruction that has not yet entered the second instruction fetch stage IF2, the branch predictor 10 can obtain the branch target address tar_address of the second instruction beforehand and output the branch target address tar_address of the second instruction to enter the first instruction fetch stage IF1 after the second instruction, so that there is no need to waste one clock cycle to flush a next instruction that is scheduled to enter the first instruction fetch stage IF1 after the second instruction.

Figure 3:
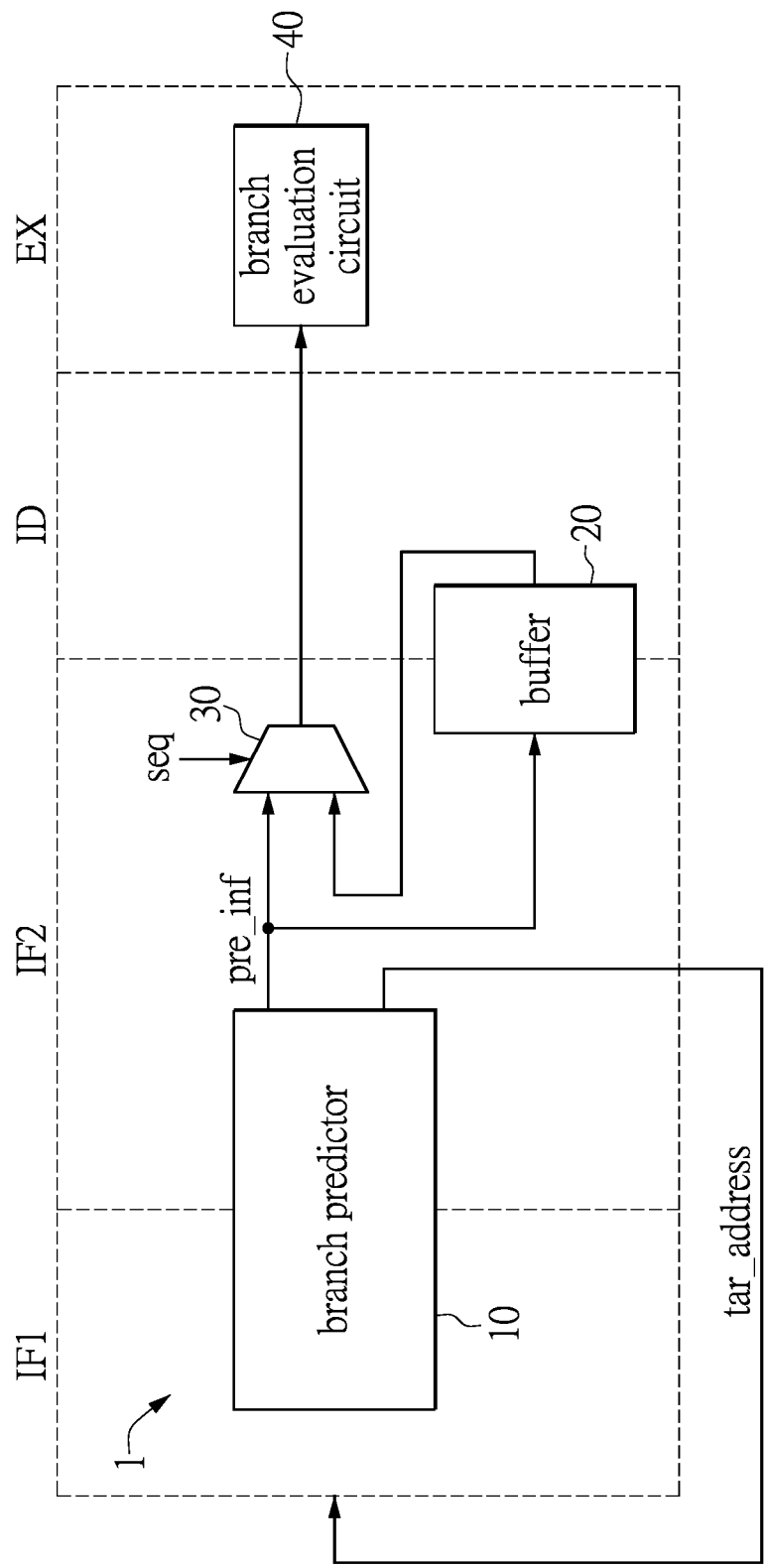
FIG. 3 is a schematic functional block diagram of the system for predicting a branch according to a second embodiment of the present disclosure.

Furthermore, if the PC value PC[x] of the first instruction matches with a reference PC value btb_pc[k], the selection circuit 106 may select a prediction target address btb_address[k] corresponding to the reference PC value btb_pc[k] as the branch target address tar_address. In addition, in response to a result of the branch prediction indicating that a branch is taken, the selection circuit 106 can further output branch prediction information pre_inf containing the taken signal tak and the hit signal btb_hit to be used in the branch evaluation of the execute stage. Reference is made in conjunction to FIG. 3, and FIG. 3 is a schematic functional block diagram of the system for predicting a branch according to a second embodiment of the present disclosure. As shown in FIG. 3, the pipeline architecture of this embodiment may further include an instruction decode stage ID and an execute stage EX, and the system 1 may further include a branch evaluation circuit 40.

When the branch instruction enters the execute stage EX, the branch evaluation circuit 40 can perform a branch evaluation for the branch instruction according to the branch prediction information pre_inf. Accordingly, the branch predictor 10 can perform the branch prediction beforehand for the branch instructions that have not yet entered the second instruction fetching stage IF2 by using the history PC values stored in the branch target buffer 100, and obtain the branch target address tar_address and branch prediction information pre_inf for the branch instructions beforehand, but the branch evaluation circuit 40 in the execute stage EX cannot perform the branch prediction beforehand for the branch instructions that have not yet entered the execute stage EX. In other words, if the second instruction is a branch instruction, the branch prediction information pre_inf output by the selection circuit 106 needs to wait for the second instruction fetch stage IF2 to finish processing the second instruction, and then enters the instruction decode stage ID with the second instruction, and cannot enter the instruction decode stage ID with the first instruction.

In the present disclosure, the system 1 can further include a buffer 20 and a multiplexer processing circuit 30. As shown in FIG. 3, the buffer 20 can be configured in the buffer interval between the second instruction fetch stage IF2 and the instruction decode stage ID to store the branch prediction information pre_inf that is output from the selection circuit 106, such that the branch prediction information pre_inf can be output after being delayed by one clock cycle. In addition, when the first instruction leaves the second instruction fetch stage IF2, according to the sequential state value seq of the first instruction, the multiplexer processing circuit 30 is configured to selectively output the branch prediction information pre_inf that is output by the selection circuit 106 or output the branch prediction information pre_inf that is stored by the buffer 20.

In other words, the method of the present embodiment may further include: configuring the buffer 20 in the buffering interval between the second instruction fetch stage IF2 and the instruction decode stage ID to store the branch prediction information pre_inf that is output by the selection circuit 106; when the first instruction leaves the second instruction fetch stage IF2, according to the sequential state value seq of the first instruction, configuring the multiplexer processing circuit 30 to selectively output the branch prediction information pre_inf that is output by the selection circuit 106 or output the branch prediction information pre_inf that is stored by the buffer 20.

Practically, in the present embodiment, a first input terminal of the multiplexer processing circuit 30 can be configured to receive the branch prediction information pre_inf that is output by the selection circuit 106, and a second input terminal of the multiplexer processing circuit 30 can be coupled to the buffer 20. In addition, a control terminal of the multiplexer processing circuit 30 can receive the sequential state value seq of the first instruction. Therefore, if the sequential state value seq of the first instruction is 0, the multiplexer processing circuit 30 may selectively output the branch prediction information pre_inf that is output by the selection circuit 106, and if the sequential state value seq of the first instruction is 1, the multiplexer processing circuit 30 may selectively output the branch prediction information pre_inf that is stored by the buffer 20.

Figure 4:
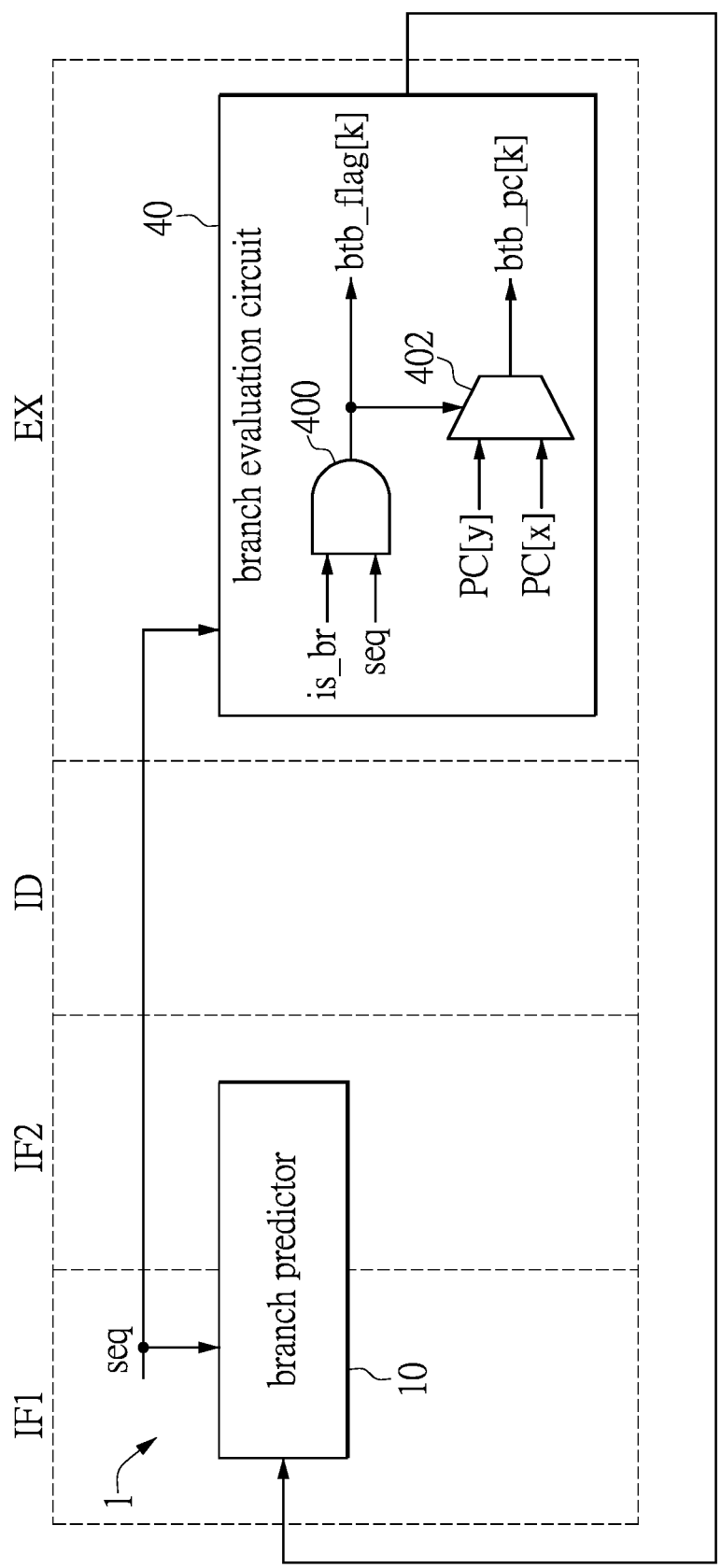
FIG. 4 is a schematic functional block diagram of the system for predicting a branch according to a third embodiment of the present disclosure.

In addition, the method of the present embodiment may further update the reference PC value stored in the branch target buffer 100 by using a branch evaluation circuit 40 in the execute phase EX. Reference is made in conjunction to FIG. 4, and FIG. 4 is a schematic functional block diagram of the system for predicting a branch according to a third embodiment of the present disclosure. As shown in FIG. 4, the branch evaluation circuit 40 may include a logic circuit 400 and a multiplexer processing circuit 402.

Specifically, the logic circuit 400 may be an AND gate, and before updating the reference PC value stored in the branch target buffer, the branch evaluation circuit 40 may further obtain a branch instruction state value is_br to indicate whether or not the second instruction is a branch instruction. For example, a branch instruction state value is_br of 0 of the second instruction may indicate that the second instruction is not a branch instruction. Therefore, in this embodiment, two input terminals of the logic circuit 400 may be configured to receive the branch instruction state value is_br of the second instruction and the sequential state value seq of the second instruction, respectively, and the control terminal of the multiplexer processing circuit 402 can be configured to receive the output of the logic circuit 400.

Further, a first input terminal of the multiplexer processing circuit 402 receives the PC value PC[y] of the second instruction, and the second input terminal of the multiplexer processing circuit 402 receives the PC value PC[x] of the first instruction executed before the second instruction. Therefore, when the branch instruction state value is_br of the second instruction and the sequential state value seq of the second instruction are both 1, the multiplexer processing circuit 402 may selectively write the PC value PC[x] of the first instruction to be executed before the second instruction to the branch target buffer 100 as one of the reference PC values such as the reference PC value btb_pc[k], and the logic circuit 400 outputs a flag value btb_flag[k] of 1. On the other hand, when the branch instruction state value is_br of the second instruction is 1 and the sequential state value seq of the second instruction is 0, the multiplexer processing circuit 402 may selectively write the PC value PC[y] of the second instruction to the branch target buffer 100 as one of the reference PC values such as the reference PC value btb_pc[k], and the logic circuit 400 outputs a flag value btb_flag[k] of 0.

In other words, the method of this embodiment may further include: when the second instruction enters the execute stage EX, in response to determining that the second instruction is a branch instruction, according to the sequential state value seq of the second instruction, determining whether to use the PC value PC[y] that is written in the second instruction or to use the PC value PC[x] of the first instruction that is executed before the second instruction as one of the reference PC values (such as the reference PC value btb_pc[k]) stored in the branch target buffer 100 and confirming the flag value btb_flag[k] corresponding to the reference PC value btb_pc[k]; and writing the branch target address of the second instruction as the prediction target address btb_address[k] stored in the branch target buffer 100 corresponding to the reference PC value btb_pc[k].

Beneficial Effects of the Embodiments

In conclusion, in the method and the system for predicting a branch of the present disclosure, the method and the system can check that the PC value of the first instruction that enters the instruction fetch stage matches with the history PC value of the history instruction executed before the branch instruction, for obtaining beforehand the branch target address of the second instruction that is executed after the first instruction, so that there is no need to waste one clock cycle to flush the next instruction that is scheduled to enter the first instruction fetch stage after the second instruction.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for predicting branch instructions, wherein the method is adapted to a processor, the processor executes a plurality of instructions that are in a series by using a pipelined architecture, and the plurality of instructions respectively have a plurality of program counter (PC) values, and wherein the pipelined architecture includes a first instruction fetch stage and a second instruction fetch stage; and the method comprises:

entering by the first instruction the first instruction fetch stage; configuring a branch predictor to read a branch target buffer that stores a plurality of reference PC values and a plurality of prediction target addresses that respectively correspond to the plurality of reference PC values, and determine whether or not a PC value of the first instruction matches with one of the plurality of reference PC values, wherein the plurality of reference PC values stored in the branch target buffer include a plurality of history PC values of a plurality of history instructions that are executed before the branch instructions, and the plurality of prediction target addresses corresponding to the plurality of history PC values are a plurality of target addresses of the branch instructions, respectively;

entering by the first instruction the second instruction fetch stage, wherein the PC value of the first instruction matches with one of the plurality of reference PC values, performing a branch prediction according to a prediction counter value;

wherein a result of the branch prediction is that a branch instruction is taken;

selecting a branch target address according to the plurality of prediction target addresses stored in the branch target buffer;

wherein the branch target buffer further stores a plurality of flag values corresponding to the plurality of reference PC values, and each of the plurality of flag values indicates whether or not a corresponding one of the plurality of reference PC values is one of the plurality of history PC values; and wherein the step of determining whether or not the PC value of the first instruction matches with one of the plurality of reference PC values further includes:

inputting the plurality of flag values, the plurality of reference PC values, a sequential state value of the first instruction, and the PC value into a comparator circuit to determine whether or not the PC value of the first instruction matches with one of the plurality of reference PC values and determine whether or not the PC value of the first instruction is sequential, wherein the sequential state value of the first instruction is used to indicate whether or not the first instruction has a jump case before entering the first instruction fetch stage.

2. The method according to claim 1, wherein the steps of performing the branch prediction according to the prediction counter value and selecting the branch target address according to the plurality of prediction target addresses stored in the branch target buffer further include:

in response to the PC value of the first instruction being sequential, by using a prediction circuit, performing the branch prediction on a second instruction that is executed after the first instruction according to the prediction counter value, and when the branch instruction is taken, by using a selection circuit, selecting a branch target address of the second instruction according to the plurality of prediction target addresses stored in the branch target buffer; and in response to the PC value of the first instruction being non-sequential, by using the prediction circuit, performing the branch prediction on the first instruction according to the prediction counter value, and when the branch instruction is taken, by using a selection circuit, selecting a branch target address of the first instruction according to the plurality of prediction target addresses stored in the branch target buffer.

3. The method according to claim 2, wherein, in response to determining that the PC value of the first instruction matches with one of the plurality of reference PC values and the PC value of the first instruction is non-sequential, the comparator circuit generates a hit signal that is in a first state, and, in response to determining that the PC value of the first instruction matches with one of the plurality of reference PC values and the PC value of the first instruction is sequential, the comparator circuit generates the hit signal that is in a second state.

4. The method according to claim 3, wherein, in response to a result of the branch prediction indicating that the branch instruction is taken, the prediction circuit generates a taken signal, and the selection circuit further outputs branch prediction information containing the taken signal and the hit signal.

5. The method according to claim 4, wherein the pipelined architecture further includes an instruction decode stage and an execute stage, and the method further comprises:
    configuring a buffer in a buffer interval between the second instruction fetch stage and the instruction decode stage to store the branch prediction information that is output by the selection circuit; and
    when the first instruction leaves the second instruction fetch stage, according to the sequential state value of the first instruction, selectively outputting the branch prediction information that is output by the selection circuit or outputting the branch prediction information that is stored by the buffer.

6. The method according to claim 5, further comprising:
    when the second instruction enters the execute stage, in response to the second instruction being one of the branch instructions, according to a sequential state value of the second instruction, determining whether to use a PC value that is written in the second instruction or to use the PC value of the first instruction that is executed before the second instruction as one of the plurality of reference PC values stored in the branch target buffer and confirming one of the plurality of flag values corresponding to the one of the plurality of reference PC values; and
    writing the branch target address of the second instruction as one of the plurality of prediction target addresses stored in the branch target buffer corresponding to the one of the plurality of reference PC values.

7. A system for predicting branch instructions, wherein the system is adapted to a processor, the processor executes a plurality of instructions that are in a series by using a pipelined architecture, and the plurality of instructions respectively have a plurality of program counter (PC) values, and wherein the pipelined architecture includes a first instruction fetch stage and a second instruction fetch stage; and the system comprises:
    a branch predictor including a branch target buffer, wherein the branch target buffer stores a plurality of reference PC values and a plurality of prediction target addresses that respectively correspond to the plurality of reference PC values; wherein the branch predictor is configured to execute steps as follows:
    when a first instruction of the plurality of instructions enters the first instruction fetch stage, reading the branch target buffer, and determining whether or not a PC value of the first instruction matches with one of the plurality of reference PC values, wherein the plurality of reference PC values stored in the branch target buffer include a plurality of history PC values of a plurality of history instructions that are executed before the branch instructions, and the plurality of prediction target addresses corresponding to the plurality of history PC values are a plurality of target addresses of the branch instructions, respectively; and
    when the first instruction enters the second instruction fetch stage, in response to the PC value of the first instruction matching with one of the plurality of reference PC values, performing a branch prediction according to a prediction counter value, and, in response to a result of the branch prediction being that a branch instruction is taken, selecting a branch target address according to the plurality of prediction target addresses stored in the branch target buffer;
    wherein the branch target buffer further stores a plurality of flag values corresponding to the plurality of reference PC values, and each of the plurality of flag values indicates whether or not a corresponding one of the plurality of reference PC values is one of the plurality of history PC values;
    wherein the branch predictor further includes a comparator circuit, and the step of determining whether or not the PC value of the first instruction matches with one of the plurality of reference PC values further includes:
    inputting the plurality of flag values, the plurality of reference PC values, a sequential state value of the first instruction, and the PC value into the comparator circuit to determine whether or not the PC value of the first instruction matches with one of the plurality of reference PC values and determine whether or not the PC value of the first instruction is sequential, wherein the sequential state value of the first instruction is used to indicate whether or not the first instruction has a jump case before entering the first instruction fetch stage.

8. The system according to claim 7, wherein the branch predictor further includes a prediction circuit and a selection circuit, and the steps of performing the branch prediction according to the prediction counter value and selecting the branch target address according to the plurality of prediction target addresses stored in the branch target buffer further include:
    in response to the PC value of the first instruction being sequential, by using the prediction circuit, performing the branch prediction on a second instruction that is executed after the first instruction according to the prediction counter value, and when the branch instruction is taken, by using the selection circuit, selecting a branch target address of the second instruction according to the plurality of prediction target addresses stored in the branch target buffer; and
    in response to the PC value of the first instruction being non-sequential, by using the prediction circuit, performing the branch prediction on the first instruction according to the prediction counter value, and when the branch instruction is taken, by using a selection circuit, selecting a branch target address of the first instruction according to the plurality of prediction target addresses stored in the branch target buffer.

9. The system according to claim 8, wherein, in response to determining that the PC value of the first instruction matches with one of the plurality of reference PC values and the PC value of the first instruction is non-sequential, the comparator circuit generates a hit signal that is in a first state, and, in response to determining that the PC value of the first instruction matches with one of the plurality of reference PC values and the PC value of the first instruction is sequential, the comparator circuit generates the hit signal that is in a second state.

10. The system according to claim 9, wherein, in response to a result of the branch prediction indicating that the branch instruction is taken, the prediction circuit generates a taken signal, and the selection circuit further outputs branch prediction information containing the taken signal and the hit signal.

11. The system according to claim 10, herein the pipelined architecture further includes an instruction decode stage and an execute stage, and the system further comprises:
- a buffer being configured in a buffer interval between the second instruction fetch stage and the instruction decode stage to store the branch prediction information that is output by the selection circuit; and
- a multiplexer processing circuit, wherein, when the first instruction leaves the second instruction fetch stage, according to the sequential state value of the first instruction, the multiplexer processing circuit is configured to selectively output the branch prediction information that is output by the selection circuit or output the branch prediction information that is stored by the buffer.

12. The system according to claim 11, further comprising:
a branch evaluation circuit configured to execute steps as follows:
- when the second instruction enters the execute stage, in response to the second instruction being one of the branch instructions, according to a sequential state value of the second instruction, determining whether to use a PC value that is written in the second instruction or to use the PC value of the first instruction that is executed before the second instruction as one of the plurality of reference PC values stored in the branch target buffer and confirming one of the plurality of flag values corresponding to the one of the plurality of reference PC values; and
- writing the branch target address of the second instruction as one of the plurality of prediction target addresses stored in the branch target buffer corresponding to the one of the plurality of reference PC values.

* * * * *